United States Patent [19]

Berner et al.

[11] Patent Number: 4,540,598
[45] Date of Patent: Sep. 10, 1985

[54] PROCESS FOR CURING ACID-CURABLE FINISHES

[75] Inventors: Godwin Berner, Rheinfelden; Werner Rutsch, Fribourg, both of Switzerland

[73] Assignee: Ciba-Geigy Corporation, Ardsley, N.Y.

[21] Appl. No.: 639,040

[22] Filed: Aug. 9, 1984

[30] Foreign Application Priority Data

Aug. 17, 1983 [CH] Switzerland ............... 4484/83

[51] Int. Cl.³ ............... B05D 3/06; C08F 2/50
[52] U.S. Cl. ............... 427/54.1; 204/159.24
[58] Field of Search ............... 427/54.1; 204/159.23, 204/159.24

[56] References Cited

U.S. PATENT DOCUMENTS

| | | | |
|---|---|---|---|
| 3,842,019 | 10/1974 | Kropp | 204/159.24 |
| 4,017,652 | 4/1977 | Gruber. | |
| 4,026,705 | 5/1977 | Crivello et al. . | |
| 4,069,054 | 1/1978 | Smith . | |
| 4,347,342 | 8/1982 | Van Drumpt et al. . | |
| 4,351,935 | 9/1982 | Reesink et al. . | |
| 4,366,228 | 12/1982 | Specht et al. . | |
| 4,431,774 | 2/1984 | Felder-Schraner et al. | 204/159.24 |
| 4,437,836 | 3/1984 | Schmitz-Josten et al. | 204/159.24 |
| 4,504,372 | 3/1985 | Kirshmayr et al. | 204/159.24 |

*Primary Examiner*—John H. Newsome
*Attorney, Agent, or Firm*—Luther A. R. Hall

[57] ABSTRACT

Oxime sulfonates of the formula I

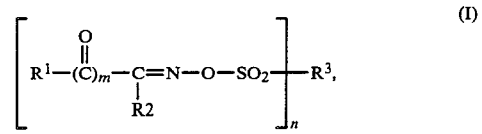

in which m is 0 or 1 and n is 1 or 2, $R^1$ and $R^2$ are monovalent radicals or, together with the atoms to which they are linked, form a ring system, and $R^3$ is the n-valent radical of a mono- or di-sulfonic acid, can be split photochemically to give the free sulfonic acid. They can therefore be used as latent acid catalysts for combined radiation curing and heat curing of acid-curable finishes.

7 Claims, No Drawings

PROCESS FOR CURING ACID-CURABLE FINISHES

The invention relates to a process for curing acid-curable baking finishes in the presence of a blocked acid catalyst by irradiation with short-wave light and subsequent heating.

Acid-curable baking finishes are used for those applications where a high baking temperature is to be avoided. As a binder, these finishes contain an acid-curable resin, for example a melamine resin, urea resin, phenolic resin, epoxide resin or mixtures thereof with curable polyester resins, acrylic resins and alkyd resins. The acid curing catalysts used are predominantly organic acids, such as sulfonic acids or carboxylic acids. Since these acids effect slow curing even at room temperature, they are added to the finish only shortly before the latter is applied, and this involves the problem of adhering to defined pot lives. In order to avoid this problem, the use of blocked acid catalysts has been proposed, from which the free acid namely the actual curing catalyst, is formed on heating. Examples of these are sulfonic acid salts or esters which can be thermally decomposed.

Thus, in EP-A1 44.115. mono- or di-sulfonates of oximes, for example benzilmonoxime tosylate, are described as blocked curing catalysts.

These sulfonates are added to the finish and such a composition can be stored for several weeks. On heating of the finish to 130° C., the oxime sulfonate decomposes, and the sulfonic acid formed catalyses the curing of the finish. The decomposition temperature of the sulfonate here determines the level of the baking temperature, i.e. only slow curing of the finish takes place below decomposition temperature.

It has now been found that such oxime sulfonates can be decomposed not only thermally, but also by ultraviolet radiation. This makes it possible to reduce the baking temperature, since the latter is no longer determined by the level of the decomposition temperature of the catalyst. This enables acid-curable finishes to be fully cured at temperatures of about 100° C. within the times customary in industry.

The invention therefore relates to a process for curing baking finishes, which contain an acid-curable resin and, as a curing catalyst, a blocked sulfonic acid of the formula I

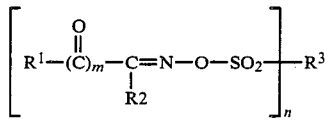

in which m is 0 or 1 and n is 1 or 2, $R^1$ is $C_1$–$C_{12}$-alkyl, $C_1$–$C_4$-halogenoalkyl, $C_2$–$C_6$-alkenyl, $C_5$–$C_{12}$-cycloalkyl, $C_6$–$C_{10}$-aryl which is unsubstituted or mono- or polysubstituted by halogen, $C_1$–$C_{16}$-alkyl, $C_1$–$C_4$-alkoxy, phenoxy, phenyl or nitro, furyl, thienyl, $C_7$–$C_{12}$-aralkyl, $C_1$–$C_8$ alkoxy, $C_5$–$C_8$-cycloalkoxy, phenoxy or $H_2N$—CO—NH—, $R^2$ is as defined for $R^1$ or is —CN, $C_2$–$C_5$-alkanoyl, benzoyl, $C_2$–$C_5$ alkoxycarbonyl, phenoxycarbonyl, —$N(R^4)$ $(R^5)$ morpholino or piperidino, or $R^1$ and $R^2$ together with the atoms to which they are linked, form a 5-membered to 8-membered ring to which 1 or 2 benzo radicals can be fused, $R^4$ being hydrogen, $C_1$–$C_{12}$-alkyl, phenyl, $C_2$–$C_9$-alkanoyl or benzoyl, and $R^5$ being hydrogen, $C_1$–$C_{12}$-alkyl or cyclohexyl, and $R^3$, with n=1, is $C_1$–$C_{18}$-alkyl, $C_6$–$C_{10}$-aryl which is unsubstituted or mono- or poly-substituted by halogen, $C_1$–$C_4$-halogenoalkyl, $C_1$–$C_{16}$-alkyl, $C_1$–$C_4$-alkoxy, $C_1$–$C_4$-alkyl-CONH—, phenyl-CONH—, benzoyl or nitro, $C_5$–$C_{12}$-cycloalkyl, $C_7$–$C_9$-aralkyl, camphoryl, —$CF_3$, —$CCl_3$ or —$NH_2$ and, with n=2, $R^3$ is $C_2$–$C_{12}$-alkylene, unsubstituted or $C_1$–$C_{12}$-alkyl-substituted phenylene, naphthylene, diphenylene or oxydiphenylene, which process comprises irradiating the finish with short-wave light, whereby the free sulfonic acid is formed, and then fully curing it at an elevated temperature.

$C_1$–$C_{12}$-Alkyl radicals $R^1$, $R^2$, $R^4$ and $R^5$ can be unbranched or branched alkyl, for example methyl, ethyl, propyl, isopropyl, n-butyl, s-butyl, t-butyl, n-pentyl, isoamyl, n-hexyl, 2-ethylbutyl, n-octyl, 2-ethylhexyl, n-decyl and n-dodecyl. A $C_1$–$C_{18}$-alkyl radical $R^3$ can, in addition, also be, for example, n-tetradecyl, n-pentadecyl, n-hexadecyl or n-octadecyl.

$C_1$–$C_4$-Halogenoalkyl radicals $R^1$ or $R^2$ can, for example, be chloromethyl, trichloromethyl, trifluoromethyl or 2-bromopropyl.

$C_2$–$C_6$-Alkenyl radicals $R^1$ and $R^2$ can, for example, be vinyl, allyl, 1-propenyl, isopropenyl, methallyl or 2-butenyl. $C_5$–$C_{12}$-Cycloalkyl radicals $R^1$, $R^2$ and $R^3$ can, for example, be cyclopentyl, cyclohexyl, cyclooctyl or cyclododecyl.

Unsubstituted or substituted aryl radicals $R^1$ and $R^2$ can, for example, be phenyl, 4-fluorophenyl, 4-chlorophenyl, 2,4-dichlorophenyl, 2,6-dichlorophenyl, p-tolyl, 2,4-dimethylphenyl, 4-isopropylphenyl, 4-t-butylphenyl, 4-dodecylphenyl, 4-methoxyphenyl, 4-butoxyphenyl, 4-phenoxyphenyl, 4-biphenylyl, 3-nitrophenyl, 1- or 2-naphthyl, 5-chloro-1-naphthyl, 6-bromo-2-naphthyl, 4-nitro-1-naphthyl or 6-methoxy-2-naphthyl. A furyl or thienyl radical $R^1$ is preferably 2-furyl or 2-thienyl.

An unsubstituted or substituted aryl radical $R^3$ can, for example, be phenyl, 4-chlorophenyl, 2,4-dichlorophenyl, 2,6-dichlorophenyl, 4-(trifluoromethyl)-2-nitrophenyl, p-tolyl, 2,4-dimethylphenyl, 4-isopropylphenyl, 4-octylphenyl, 4-nonylphenyl, 4-dodecylphenyl, 4-tetradecylphenyl, 3- or 4-methoxyphenyl, 4-acetamidophenyl, 4-benzamidophenyl, 4-benzoylphenyl, 3-nitrophenyl, naphthyl, diisobutylnaphthyl, nonylnaphthyl, dinonylnaphthyl or dodecylnaphthyl.

A $C_7$–$C_9$-aralkyl radical $R^3$ can, for example, be benzyl, 1- or 2-phenylethyl or 3- phenylpropyl. $C_7$–$C_{12}$-Aralkyl radicals $R^1$ and $R^2$ can in addition also be, for example, 2-phenylisopropyl, 2-phenylhexyl or 2-naphthylmethyl.

A $C_2$–$C_9$-alkanoyl radical $R^4$ can, for example, be acetyl, propionyl, butyryl, hexanoyl or octanoyl.

An alkoxy radical $R^1$ is preferably methoxy or ethoxy. A cycloalkoxyl radical $R^1$ is preferably cyclohexyloxy.

If $R^1$ and $R^2$, together with the atoms to which they are linked, form a 5-membered to 7-membered ring, this can be an isocyclic or heterocyclic ring, for example a cyclopentane, cyclohexane, cycloheptane, pyran or piperidine ring. Benzo radi-cals can be fused to this ring, and examples are tetrahydro-naphthalene, dihydroanthracene, indan, chroman, fluorene, xanthene or thioxanthene ring systems. The ring can also contain carbonyl groups. Examples of this are benzoquinone, naphthoquinone or anthraquinone radicals.

With n=2, $R^3$ can, for example, be tetramethylene, hexamethylene, octamethylene, 1,3-phenylene, 1,5-naphthylene, 2,6-naphthylene, 4,4'-diphenylene or 4,4'-oxydiphenylene.

Preferably, the blocked curing catalyst used is a compound of the formula I, in which m is 0 or 1, n is 1, $R^1$ is $C_1$-$C_{12}$-alkyl, $C_1$-$C_4$-halogenoalkyl, $C_5$-$C_{12}$-cycloalkyl, $C_6$-$C_{10}$-aryl which is unsubstituted or mono- or di-substituted by Cl, $C_1$-$C_{16}$-alkyl, $C_1$-$C_4$-alkoxy, phenoxy or nitro, 2-furyl, 2-thienyl, $C_1$-$C_4$-alkoxy, cyclohexyloxy or phenoxy, $R^2$ is as defined for $R^1$ or is —CN, $C_2$-$C_5$-alkanoyl, benzoyl, $C_2$-$C_5$-alkoxycarbonyl, —N($R^4$) ($R^5$) or morpholino, or $R^1$ and $R^2$, together with the atoms to which they are linked, form a 5-membered to 8-membered ring, to which 1 to 2 benzo radicals can be fused, $R^4$ being hydrogen, $C_1$-$C_4$-alkyl, phenyl, $C_2$-$C_5$-alkanoyl or benzoyl and $R^5$ being hydrogen or $C_1$-$C_4$-alkyl, and $R^3$ is $C_1$-$C_{18}$-alkyl, $C_6$-$C_{10}$-aryl, which is unsubstituted or mono- or poly-substituted by halogen, $C_1$-$C_4$-halogenoalkyl, $C_1$-$C_{16}$-alkyl, $C_1$-$C_4$-alkoxy or nitro, $C_5$-$C_{12}$-cycloalkyl, camphoryl, —$CF_3$ or —$CCl_3$.

Particularly preferably, the curing catalyst is of the formula I, in which m is 0 or 1, n is 1, $R^1$ is $C_1$-$C_4$-alkyl, trifluoromethyl, phenyl which is unsubstituted or mono- or di-substituted by Cl, $C_1$-$C_4$-alkyl, $C_1$-$C_4$-alkoxy or nitro, 2-furyl, 2-thienyl or $C_1$-$C_4$-alkoxy, $R^2$ is as defined for $R^1$ or is —CN, dialkylamino or morpholino, or $R^1$ and $R^2$, together with the atoms of which they are linked, form a 5-membered or 6-membered ring, to which 1 or 2 benzo radicals can be fused, and $R^3$ is $C_1$-$C_4$-alkyl or phenyl which is unsubstituted or mono- or di-substituted by Cl, $CF_3$, $C_1$-$C_{16}$-alkyl or $NO_2$, in particular those in which m is 0 or 1, n is 1, $R^1$ is $C_1$-$C_4$-alkyl, trifluoromethyl, phenyl, mono- or dichlorophenyl or nitrophenyl, $R^2$ is as defined for $R^1$ or is —CN, or $R^1$ and $R^2$, together with the atoms to which they are linked, form a 5-membered to 6-membered ring to which one or two benzo groups can be fused, and $R^3$ is methyl, phenyl or $C_1$-$C_{16}$-alkyl-substituted phenyl.

Many of these oxime sulfonates form syn- and anti-stereoisomers. Both isomers or their mixture can be useful for the application according to the invention. If these are α-keto-oxime sulfonates (monoxime sulfonates of 1,2-diketones), the anti-forms of which show a low stability, use of the syn-isomers is preferred according to the invention.

The following compounds are examples of oxime sulfonates of the formula I, which can be used as blocked curing catalysts:

(1) benzylmonoxime tosylate

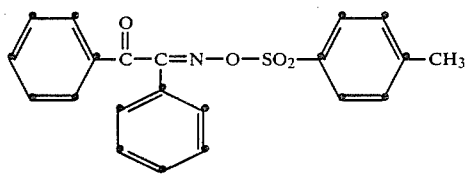

(2) benzilmonoxime p-dodecylbenzenesulfonate
(3) benzilmonoxime hexadecanesulfonate
(4) 4-nitroacetophenoneoxime tosylate (5) ethyl α-tosyloxyimino-caproate

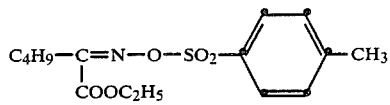

(6) ethyl α-cyclohexylsulfonyloxyimino-phenylacetate

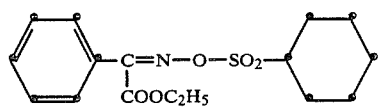

(7) phenyl α-(4-chlorophenylsulfonyloxyimino)-caproate

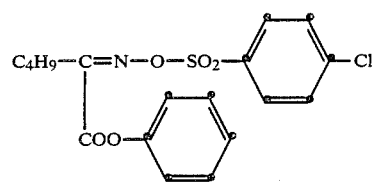

(8) 4,4'-dichlorobenzilmonoxime methanesulfonate
(9) 4,4'-dimethylbenzilomonoxime tosylate
(10) 4,4'-dimethoxybenzilmonoxime p-dodecylbenzenesulfonate
(11) dibenzylketoneoxime tosylate
(12) ethyl α-tosyloxyimino-cyanoacetate
(13) furylmonoxime 4-acetamidobenzenesulfonate
(14) acetoneoxime p-benzoylbenzenesulfonate
(15) 1-amino-1-(camphor-10-sulfonyloxyimino)-2-phenylethane

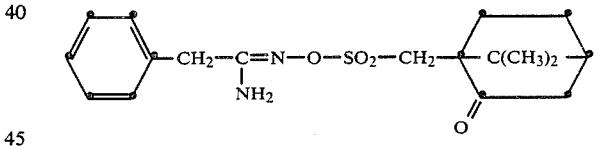

(16) cyclohexyl α-(2-nitrophenylsulfonyloxyimino)-cyclohexylacetate
(17) ethyl α-(2-naphthylsulfonyloxyimino)-benzoylacetate

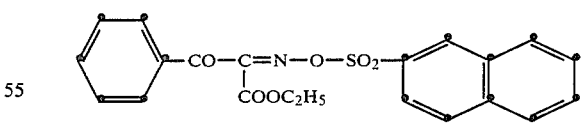

(18) 3-benzylsulfonyloxyimino-acetylacetone

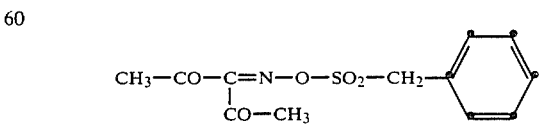

(19) 1-morpholino-1-(trichloromethylsulfonyloxyimino)-2-phenylethane
(20) bis-(benzylmonoxime) butane-1,4-disulfonate

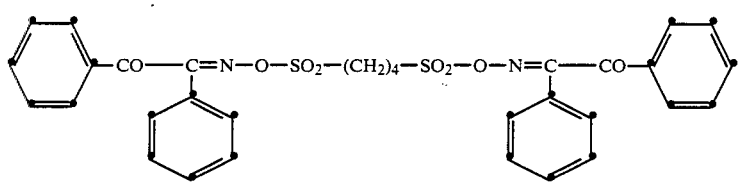

(21) bis-(benzylmonoxide) dioctylnaphthalenedisulfonate

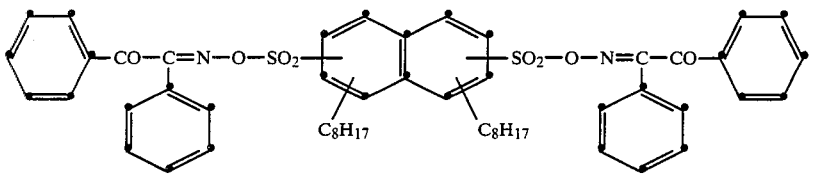

(22) bis-(ethyl α-hydroxyiminocaproate) diphenylene-4,4′-disulfonate

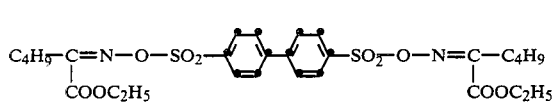

(23) bis-(ethyl α-hydroxyiminocaproate) diphenyl oxide-4,4′-disulfonate

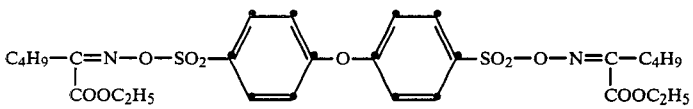

(24) α-tetralonoxime tosylate
(25) 1-indanonoxime tosylate
(26) anthraquinonemonoxime tosylate
(27) xanthonoxime tosylate
(28) thioxanthonoxime tosylate
(29) α-(p-toluenesulfonyloxy-imino)-benzyl cyanide

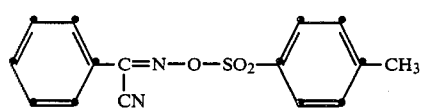

(30) α-(p-chlorobenzenesulfonyloxyimino)-benzyl cyanide
(31) α-(4-nitrobenzenesulfonyloxyimino)-benzyl cyanide
(32) α-(4-nitro-2-trifluoromethylbenzenesulfonyloxyimino)-benzyl cyanide
(33) α-(benzenesulfonyloxyimino)-4-chlorobenzyl cyanide
(34) α-(benzenesulfonyloxyimino)-2,4-dichlorobenzyl cyanide
(35) α-(benzenesulfonyloxyimino)-2,6-dichlorobenzyl cyanide
(36) α-(benzenesulfonyloxyimino)-4-methoxybenzyl cyanide
(37) α-(2-chlorobenzenesulfonyloxyimino)-4-methoxybenzyl cyanide
(38) α-(benezenesulfonyloxyimino)-thien-2-ylacetonitrile

(39) 4-chloro-α-trifluoroacetophenonoxime benzenesulfonate

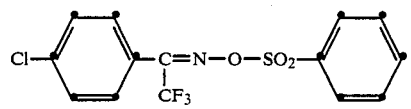

(40) methyl α-(benzenesulfonyloxyimino)-cyanoacetate
(41) fluoroineonoxime tosylate
(42) 2,6-di-tert.-butyl-benzoquinonemonoxime tosylate

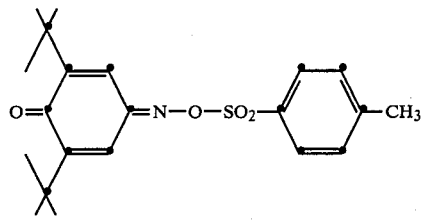

(43) α-(benzenesulfonyloxyimino)-ureidocarbonylacetonitrile

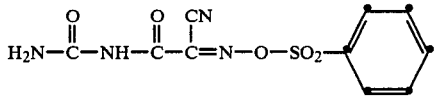

(44) α-(p-toluenesulfonyloxyimino)-benzoylacetonitrile
(45) α-(p-toluenesulfonyloxyimino)-4-methoxybenzoylacetonitrile
(46) indan-1,3-dione-monoxime tosylate
(47) 2,3-dihydro-1,4-naphthoquinone-monoxime tosylate

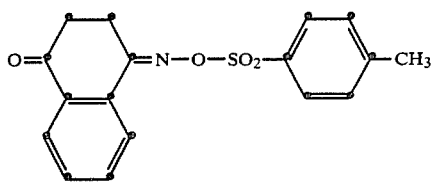

(48) acteophenonoxime tosylate
(49) chromanonoxime tosylate

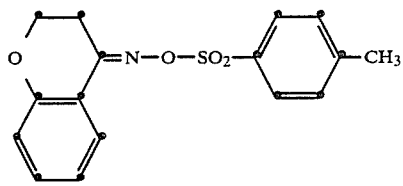

Some of the compounds of the formula I are known compounds, such as are described, for example, in EP-A1 44,115. They can be prepared by reacting the corresponding oximes with the corresponding sulfonic acid chloride or disulfonic acid chloride. The oximes required for this reaction as the starting materials are either known compounds or they can be obtained by the methods conventional for the preparation of oximes, for example by reacting the corresponding carbonyl or thicarbonyl compounds with hydroxylamine or by nitrosation of reactive CH₂ groups or by nitrosation of hydroxyaromatics.

The curing catalysts of the formula I are added to the finishes in a quantity sufficient for curing. The required quantity depends on the nature of the resin and on the intended curing temperature and curing time. In general, 0.1 to 10% by weight, preferably 0.5 to 5% by weight, relative to the solvent-free resin, are used. Mixtures of curing catalysts of the formula I can also be employed.

The acid-curable resins used can be all those resins, the curing of which can be accelerated by acid catalysts. These are especially melamine, urea, epoxide, phenolic, acrylic, polyester and alkyd resins, and in particular the mixtures of acrylic, polyester or alkyd resins with a melamine resin. These also include modified surface-coating resins, such as acrylic-modified polyester and alkyd resins. Examples of individual types of resins, which are covered by the term acrylic, polyester and alkyd resins, are described, for example, in Wagner, Sarx: Lackkunstharze [Synthetic surface-coating resins] (Munich, 1971), pages 86 to 123 and 229 to 238, or in Ullmann: Encyclopädie der techn. Chemie [Encyclopaedia of Industrial Chemistry], 4th edition, Volume 15 (1978), pages 613 to 628. Preferably, the finish contains an amino resin. Examples of this are unetherified or etherified melamine, urea, guanidine or biuret resins. The acid catalyst is of particular importance for the curing of finishes which contain etherified amino resins, such as methylated or butylated melamine resins (N-methoxymethyl- or N-butoxymethyl-melamine respectively) or methylated/butylated glycolurils, for example that of the formula

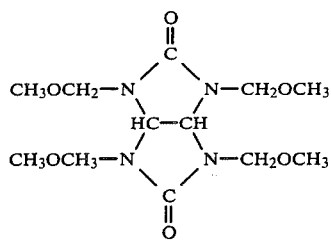

Examples of further resin compositions are mixtures of acrylic and polyester resins containing polyfunctional alcohols or hydroxyl groups, or mixtures of partially saponified polyvinyl acetate or polyvinyl alcohol with polyfunctional dihydropyranyl derivatives, such as derivatives of 3,4-dihydro-2H-pyran-2-carboxylic acid.

For certain purposes, resin mixtures are also used which contain monomeric or oligomeric constituents with polymerisable unsaturated groups. Such finishes can also be cured by the process according to the invention. In this case, (a) free-radical polymerization initiators or
(b) photoinitiators, for example those from the class of aromatic ketones, benzoin compounds, benzil ketals or 60-hydroxyacetophenone derivatives, can also be used in addition. The former initiate the polymerisation of the unsaturated groups during the heat treatment, and the latter initiate the polymerisation during the ultraviolet irradiation.

The finishes can be solutions or dispersions of the surface-coating resin in an organic solvent or in water, but they can also be solvent-free. Of particular interest are finishes with a low proportion of solvent, so-called "high-solids finishes". The finishes can be clear finishes, such as are used, for example, in the motor vehicle industry as top coats of multi-layer coatings. They can also contain pigments, either inorganic or organic pigments, and also metal powders for metal-effect finishes.

Furthermore, the finishes can contain minor amounts of specific additives, such as are conventional in surface-coating technology, for example flow aids, thixotropic agents, light stabilisers, antioxidants or photoinitiators.

Examples of light stabilisers are those from the group comprising hydroxyphenyl-benzotriazoles, hydroxybenzophenones, cyanoacrylates, hydroxyphenyltriazines, oxalanilides, organic nickel compounds and polyalkylpiperidine derivatives. Since light stabilisers of the ultraviolet absorber type can interfere with the ultraviolet irradiation according to the invention, such light stabilisers can also be added to an adjacent coating layer, from which they then diffuse gradually into that layer of the baking finish which is to be protected. The adjacent coating layer can be a primer underneath the baking finish or a top coat above the baking finish.

The finish can be applied by any of the methods conventional in industry, for example by spraying, brushing or dipping. When suitable finishes are used, electrophoretic applicaton, for example by electrocoating, is also possible. After drying, the finish film is irradiated with short-wave light. Ultraviolet light is preferably used for this purpose.

A range of suitable technical apparatus is nowadays available for this purpose, including medium-pressure, high-pressure or low-pressure mercury lamps and fluorescent tubes, the emission maxima of which are at 250 to 400 nm. The irradiation times necessary depend on the layer thickness of the resin, on the pigmenting, on the light intensity of the lamps and on the distance of the lamps. An unpigmented finish in the usual layer thickness requires a few seconds of exposure times in customary ultraviolet irradiation apparatus. Within this time, the latent catalyst has been photochemically converted, with the formation of free sulfonic acid.

If photosensitisers are also added to the resin, the irradiation time can be shortened and/or other light sources can be used. Examples of known photosensitisers are aromatic ketones or aromatic aldehydes (such as described, for example, in U.S. Pat. No. 4,017,652), coumarins (such as are described, for example, in U.S. Pat. No. 4,366,228), thioxanthones, fused aromatics, for example perylene, aromatic amines (such as are described, for example, in U.S. Pat. No. 4,069,054) or cationic and basic dyes (such as are described, for example, in U.S. Pat. No. 4,026,705).

Subsequently, the surface-coating film is cured by heat treatment. In contrast to processes without irradiation, this can be carried out at relatively low temperatures. With a baking time of about 30 minutes, and using about 2% of catalyst, baking temperatures of about 70 to 80° C. suffice. When 1% of catalyst is used, temperatures of about 80° to 100° C. are required, and about 100° to 120° C. when 0.5% of catalyst is used. By contrast, without irradiation, temperatures which are 20°–50° C. higher are required at the same baking times. Preferably, the finishes catalysed accordng to the invention are, after the irradiation, fully cured at temperatures below 120° C., in particular at 80°–100° C.

These relatively low baking temperatures in the process according to the invention are of considerable industrial importance in the coating or finishing of temperature-sensitive substrates. Examples of these are objects of wood or cardboard, and in particular objects which contain plastic or rubber parts, for example electrical appliances, vehicles of any type or machines.

Slow curing of the finish after irradiation starts even without heating, i.e. at room temperature. Such curing, however, takes several days, so that it can be of industrial interest only in exceptional cases.

Compared with the addition of a free acid as a curing catalyst, the blocked sulfonic acids used according to the invention have the advantage that the finishes, to which they have been added, have a substantially longer pot life.

The process according to the invention is suitable for all types of industrial coating and finishing, for example for the surface-coating of machines, vehicles, ships or structural components. It is of particular importance for the surface-coating of motor vehicles. In this case, it can be used for single-coat finishing and multicoat finishing. Application of the process is also of particular interest for continuous coating of sheets, for example steel or aluminum sheets, by the so-called coil coat process. In addition, the process is suitable for curing acid-curable printing inks which, due to their excellent absorption properties, are particularly suitable for printing on metal sheets.

A further field of use is the curing of acid-curable bonded abrasive product compositions, as described in more detail in DE-A1 3,317,570.

The examples which follow illustrate the process by reference to specific acid-curable baking finishes. Parts are here parts by weight, and % are percent by weight. The temperatures are given in °C.

EXAMPLE 1

Curing of a finish based on an acrylic/melamine resin.

Aluminium sheets of 0.5 mm thickness, coated with a white-pigmented primer based on polyester resin, are coated with a high-solids clear finish of the following composition:

| | |
|---|---|
| hexamethoxymethylmelamine (Cymel ® 301, Amer. Cyanamid, 100%) | 17.93 parts |
| butyl acetate | 9.73 parts |
| cellulose acetobutyrate (CAB ® 551001, Eastman Chem.) | 1.83 parts |
| flow aid based on silicone (Byketol ® Spez., ByK-Mallinckrodt) | 2.80 parts |
| flow aid based on polymer (Modaflow ®, 1% solution; Monsanto) | 0.29 part |
| hydroxy-functional acrylic resin (Paraloid ® AT 410, 73% by weight; Rohm and Haas) | 57.30 parts |
| n-butanol | 10.12 parts |
| | 100.00 parts |

The solids content of this formulation is about 60%.

The catalyst in a quantity of 1%, relative to solvent-free binder, is first dissolved in part of the butanol and then incorporated into the above resin formulation.

The finish is applied by means of an electrical film spreader apparatus in such a way that the dry film thickness is about 30 μm. After an airing time of 15 minutes, the samples are exposed to ultraviolet irradiation, varying the irradiation time, in a PPG irradiation apparatus with 2 high-pressure mercury vapour lamps of 80 watt each. Subsequently, the samples are baked in a finishing oven for 30 minutes at 100° C.

To assess the degree of curing, the pendulum hardness of the finish film is determined by the König method (DIN 53,158), both 30 minutes and 24 hours after baking.

The results are listed in Table 1. The numbers of the catalysts, given in the table, refer to the list.

TABLE 1

| Catalyst (always 1%) | Irradiation time (sec.) | Pendulum hardness (sec.) | |
|---|---|---|---|
| | | after 30 min. | after 24 hours |
| No. 1 | 0 | 58 | 56 |
| | 2.1 | 179 | 190 |
| | 4.2 | 184 | 194 |
| | 8.4 | 184 | 195 |
| | 12.6 | 183 | 194 |
| No. 4 | 0 | 19 | 18 |
| | 2.1 | 179 | 188 |
| | 4.2 | 180 | 189 |
| | 8.4 | 178 | 190 |
| | 12.6 | 179 | 190 |
| No. 12 | 0 | 20 | 27 |
| | 2.1 | 124 | 146 |
| | 4.2 | 155 | 179 |
| | 8.4 | 174 | 190 |
| | 12.6 | 178 | 189 |
| No. 24 | 0 | 10 | 13 |
| | 2.1 | 158 | 165 |
| | 4.2 | 176 | 186 |
| | 8.4 | 186 | 193 |
| | 12.6 | 189 | 197 |
| No. 25 | 0 | 13 | 13 |
| | 2.1 | 104 | 106 |
| | 4.2 | 146 | 151 |
| | 8.4 | 169 | 193 |
| | 12.6 | 179 | 193 |
| No. 28 | 0 | 10 | 11 |
| | 2.1 | 143 | 155 |
| | 4.2 | 165 | 179 |

TABLE 1-continued

| Catalyst (always 1%) | Irradiation time (sec.) | Pendulum hardness (sec.) after 30 min. | after 24 hours |
|---|---|---|---|
| | 8.4 | 174 | 183 |
| | 12.6 | 181 | 193 |

This shows that, even after a short irradiation time, a marked effect is obtained, as compared with the unirradiated samples, and this no longer shows a significant increase when the irradiation time is extended.

EXAMPLE 2

Curing of a finish based on an acrylic/melamine resin

The same finish as in Example 1 is used, but it is applied to glass plates in a layer thickness which is about 45 μm after curing. Curing and testing are carried out as in Example 1, and the catalyst is used in a quantity of 1%, relative to the binder. Table 2 shows the pendulum hardness for curing after varying irradiation times. The results confirm the finding, shown in Example 1, that the catalyst is activated even after a short irradiation.

TABLE 2

| Catalyst (always 1%) | Irradiation time (sec.) | Pendulum hardness (sec.) after 30 min. | after 24 hours |
|---|---|---|---|
| No. 29 | 0 | 10 | 9 |
| | 2.1 | 179 | 190 |
| | 4.2 | 189 | 199 |
| | 8.4 | 193 | 203 |
| | 12.6 | 190 | 196 |
| No. 30 | 0 | 11 | 11 |
| | 2.1 | 183 | 190 |
| | 4.2 | 190 | 191 |
| | 8.4 | 193 | 195 |
| | 12.6 | 192 | 192 |
| No. 31 | 0 | 8 | 7 |
| | 2.1 | 169 | 174 |
| | 4.2 | 183 | 195 |
| | 8.4 | 189 | 197 |
| | 12.6 | 195 | 203 |
| No. 32 | 0 | 13 | 14 |
| | 2.1 | 160 | 175 |
| | 4.2 | 171 | 187 |
| | 8.4 | 175 | 189 |
| | 12.6 | 170 | 192 |
| No. 33 | 0 | 14 | 14 |
| | 2.1 | 175 | 192 |
| | 4.2 | 182 | 197 |
| | 8.4 | 185 | 196 |
| | 12.6 | 187 | 196 |
| No. 34 | 0 | 10 | 13 |
| | 2.1 | 172 | 199 |
| | 4.2 | 176 | 207 |
| | 8.4 | 182 | 200 |
| | 12.6 | 186 | 197 |
| No. 35 | 0 | 15 | 18 |
| | 2.1 | 130 | 147 |
| | 4.2 | 170 | 189 |
| | 8.4 | 182 | 202 |
| | 12.6 | 189 | 201 |
| No. 36 | 0 | 14 | 18 |
| | 2.1 | 156 | 177 |
| | 4.2 | 171 | 189 |
| | 8.4 | 178 | 187 |
| | 12.6 | 183 | 189 |
| No. 37 | 0 | 9 | 10 |
| | 2.1 | 155 | 168 |
| | 4.2 | 176 | 186 |
| | 8.4 | 185 | 196 |
| | 12.6 | 188 | 203 |
| No. 38 | 0 | 10 | 10 |
| | 2.1 | 135 | 143 |
| | 4.2 | 169 | 182 |
| | 8.4 | 179 | 192 |
| | 12.6 | 183 | 196 |

TABLE 2-continued

| Catalyst (always 1%) | Irradiation time (sec.) | Pendulum hardness (sec.) after 30 min. | after 24 hours |
|---|---|---|---|
| No. 39 | 0 | 13 | 14 |
| | 2.1 | 59 | 60 |
| | 4.2 | 130 | 130 |
| | 8.4 | 173 | 187 |
| | 12.6 | 188 | 201 |
| No. 40 | 0 | 33 | 35 |
| | 2.1 | 132 | 146 |
| | 4.2 | 166 | 180 |
| | 8.4 | 178 | 192 |
| | 12.6 | 185 | 191 |
| No. 41 | 0 | 18 | 20 |
| | 2.1 | 179 | 189 |
| | 4.2 | 188 | 197 |
| | 8.4 | 192 | 199 |
| | 12.6 | 193 | 203 |

What is claimed is:

1. A process for curing baking finishes which contain an acid-curable resin and, as a curing catalyst, a blocked sulfonic acid of the formula I

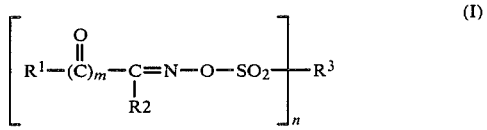

in which m is 0 or 1 and n is 1 or 2, $R^1$ is $C_1-C_{12}$-alkyl, $C_1-C_4$-halogenoalkyl, $C_2-C_6$-alkenyl, $C_5-C_{12}$-cycloalkyl, $C_6-C_{10}$-aryl which is unsubstituted or mono- or poly-substituted by halogen, $C_1-C_{16}$-alkyl, $C_1-C_4$-alkoxy, phenoxy, phenyl or nitro, furyl, thienyl, $C_7-C_{12}$-aralkyl, $C_1-C_8$-alkoxy, $C_5-C_8$-cycloalkoxy, phenoxy or $H_2N-CO-NH-$, $R^2$ is as defined for $R^1$ or is $-CN$, $C_2-C_5$-alkanoyl, benzoyl, $C_2-C_5$-alkoxycarbonyl, phenoxycarbonyl, $-N(R^4)(R^5)$, morpholino or piperidino, or $R^1$ and $R^2$, together with the atoms to which they are linked, form a 5-membered to 8-membered ring to which 1 to 2 benzo radicals can be fused, $R^4$ being hydrogen, $C_1-C_{12}$-alkyl, phenyl, $C_2-C_9$-alkanoyl or benzoyl and $R^5$ being hydrogen, $C_1-C_{12}$-alkyl or cyclohexyl, and $R^3$, with $n=1$, is $C_1-C_{18}$-alkyl, $C_6-C_{10}$-aryl which is unsubstituted or mono- or poly-substituted by halogen, $C_1-C_4$-halogenoalkyl, $C_1-C_{16}$-alkyl, $C_1-C_4$-alkoxy, $C_1-C_4$-alkyl-CONH-, phenyl-CONH-, benzoyl or nitro, $C_5-C_{12}$-cycloalkyl, $C_7-C_9$-aralkyl, camphoryl, $-CF_3$, $-CCl_3$ or $-NH_2$, and, with $n=2$, $R^3$ is $C_2-C_{12}$-alkylene, or unsubstituted or $C_1-C_{12}$-alkyl-substituted phenylene, naphthylene, diphenylene or oxydiphenylene, which comprises irradiating the finish with short-wave light, whereby the free sulfonic acid is formed, and then fully curing it at an elevated temperature.

2. A process according to claim 1, wherein the finish contains a curing catalyst of the formula I, in which m is 0 or 1, n is 1, $R^1$ is $C_1-C_{12}$-alkyl, $C_1-C_4$-halogenoalkyl, $C_5-C_{12}$-cycloalkyl, $C_6-C_{10}$-aryl which is unsubstituted or mono- or di-substituted by Cl, $C_1-C_{16}$-alkyl, $C_1-C_4$-alkoxy, phenoxy or nitro, 2-furyl, 2-thienyl, $C_1-C_4$-alkoxy, cyclohexyloxy or phenoxy, $R^2$ is as defined for $R^1$ or is $-CN$, $C_2-C_5$-alkanoyl, benzoyl, $C_2-C_5$-alkoxycarbonyl, $-N(R^4)(R^5)$ or morpholino, or $R^1$ and $R^2$, together with the atoms to which they are linked, form a 5-membered to 8-membered ring to which 1 or 2 benzo radicals can be fused, $R^4$ being hydrogen, $C_1-C_4$-alkyl, phenyl, $C_2-C_5$-alkanoyl or benzoyl and $R^5$ being hydrogen or $C_1$–$C_4$-alkyl, and $R^3$ is $C_1$–$C_{18}$-alkyl, $C_6$–$C_{10}$-aryl which is unsubstituted or mono- or poly-substituted by halogen, $C_1$–$C_4$-halogenoalkyl, $C_1$–$C_{16}$-alkyl, $C_1$–$C_4$-alkoxy or nitro, $C_5$–$C_{12}$-cycloalkyl, camphoryl, —$CF_3$ or —$CCl_3$.

3. A process according to claim 1, wherein the finish contains a curing catalyst of the formula I, in which m is 0 or 1, n is 1, $R^1$ is $C_1$–$C_4$-alkyl, trifluoromethyl, phenyl which is unsubstituted or mono- or di-substituted by Cl, $C_1$–$C_4$-alkyl, $C_1$–$C_4$-alkoxy or nitro, 2-furyl, 2-thienyl or $C_1$–$C_4$-alkoxy, $R^2$ is as defined for $R^1$ or is —CN, dialkylamino or morpholino, or $R^1$ and $R^2$, together with the atoms to which they are linked, form a 5-membered or 6-membered ring to which 1 or 2 benzo radicals can be fused, and $R^3$ is $C_1$–$C_4$-alkyl, or phenyl which is unsubstituted or mono- or di-substituted by Cl, $CF_3$, $C_1$–$C_{16}$-alkyl or $NO_2$.

4. A process according to claim 1, wherein the finish contains a curing catalyst of the formula I, in which m is 0 or 1, n is 1, $R^1$ is $C_1$–$C_4$-alkyl, trifluoromethyl, phenyl, mono- or di-chlorophenyl or nitrophenyl, $R^2$ is as defined for $R^1$ or is —CN, or $R^1$ and $R^2$, together with the atoms to which they are linked, form a 5-membered to 6-membered ring to which one or two benzo radicals are fused, and $R^3$ is methyl, phenyl or $C_1$–$C_{16}$-alkyl-substituted phenyl.

5. A process according to claim 1, wherein the finish contains an amino resin as the acid-curable resin.

6. A process according to claim 1, wherein the finish contains a mixture of a melamine resin with an acrylic, polyester or alkyd resin.

7. A process according to claim 1, wherein, after the irradiation, the finish is fully cured at a temperature below 1120° C., in particular at 80°–100° C.

* * * * *

UNITED STATES PATENT AND TRADEMARK OFFICE
CERTIFICATE OF CORRECTION

PATENT NO. : 4,540,598

DATED : September 10, 1985

INVENTOR(S) : Godwin Berner, and Werner Rutsch

It is certified that error appears in the above-identified patent and that said Letters Patent is hereby corrected as shown below:

In the claims, column 14, line 17, should read below 120° C., in particular at 80°-100° C. --.

Signed and Sealed this

Third Day of June 1986

[SEAL]

Attest:

Attesting Officer

DONALD J. QUIGG

Commissioner of Patents and Trademarks